US011042371B2

(12) United States Patent
Figuli et al.

(10) Patent No.: US 11,042,371 B2
(45) Date of Patent: *Jun. 22, 2021

(54) PLAUSABILITY-DRIVEN FAULT DETECTION IN RESULT LOGIC AND CONDITION CODES FOR FAST EXACT SUBSTRING MATCH

(71) Applicant: INTERNATIONAL BUSINESS MACHINES CORPORATION, Armonk, NY (US)

(72) Inventors: Razvan Peter Figuli, Remchingen (DE); Stefan Payer, Stuttgart (DE); Cedric Lichtenau, Stuttgart (DE); Kerstin Claudia Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,398

(22) Filed: Sep. 11, 2019

(65) Prior Publication Data

US 2021/0072990 A1    Mar. 11, 2021

(51) Int. Cl.
*G06F 11/00* (2006.01)
*G06F 9/30* (2018.01)

(52) U.S. Cl.
CPC ...... *G06F 9/30018* (2013.01); *G06F 9/30036* (2013.01); *G06F 9/30098* (2013.01)

(58) Field of Classification Search
None
See application file for complete search history.

(56) References Cited

U.S. PATENT DOCUMENTS

| 4,162,482 A * | 7/1979 | Su .................... G06K 9/56 |
| | | 382/202 |
| 4,907,194 A | 3/1990 | Yamada et al. |
| | (Continued) | |

FOREIGN PATENT DOCUMENTS

| CN | 101609455 A | 12/2009 |
| EP | 2680166 B1 | 10/2015 |
| WO | 2007076269 A2 | 7/2007 |

OTHER PUBLICATIONS

Transmittal Form PTO/SB/21, filed Mar. 19, 2020.
(Continued)

*Primary Examiner* — Mujtaba M Chaudry
(74) *Attorney, Agent, or Firm* — Cantor Colburn LLP; William Kinnaman

(57) ABSTRACT

A method for detecting faults in substring search operations includes providing, using a processor unit including vector registers of M vector elements each, an M×M matrix of comparators for characterwise comparison of the elements of a reference string stored in a first one of the vector registers and a target string stored in a second one of the vector registers. A vector element is an n-bit element for encoding a character. A resulting bit vector is generated using comparison performed by the M×M matrix. The resulting bit vector indicates characters of the target string that fully match the reference string and indicates characters of the target string that partially match the reference string. Fault detection in the substring search operations is performed by utilizing the resulting bit vector.

20 Claims, 9 Drawing Sheets

(56) References Cited

U.S. PATENT DOCUMENTS

| | | | |
|---|---|---|---|
| 5,225,833 A | | 7/1993 | Fisher et al. |
| 5,586,288 A | * | 12/1996 | Dahlberg .......... G06F 16/90344 |
| | | | 711/108 |
| 7,444,326 B1 | | 10/2008 | Jagadish |
| 7,596,553 B2 | | 9/2009 | Meirovitz |
| 7,756,847 B2 | | 7/2010 | Pauws |
| 7,872,890 B1 | | 1/2011 | Starovoytov |
| 7,991,987 B2 | | 8/2011 | Cabot |
| 8,051,085 B1 | | 11/2011 | Srinivasan |
| 8,296,279 B1 | | 12/2012 | Singh |
| 8,407,245 B2 | | 3/2013 | Ryan |
| 8,620,968 B2 | | 12/2013 | Atasu |
| 8,954,484 B2 | * | 2/2015 | Long .................. G06F 9/30018 |
| | | | 708/212 |
| 9,424,031 B2 | | 8/2016 | Thantry |
| 9,460,196 B2 | | 10/2016 | Boyce |
| 10,169,451 B1 | | 1/2019 | Payer et al. |
| 2003/0137437 A1 | | 7/2003 | Watson |
| 2004/0010752 A1 | | 1/2004 | Chan et al. |
| 2007/0011734 A1 | | 1/2007 | Balakrishnan et al. |
| 2007/0133593 A1 | | 6/2007 | Shankara |
| 2008/0040345 A1 | | 2/2008 | Cameron |
| 2008/0050469 A1 | | 2/2008 | Kwon |
| 2008/0208850 A1 | | 8/2008 | Boyce |
| 2010/0142813 A1 | | 6/2010 | Abdo |
| 2010/0225506 A1 | | 9/2010 | Chen et al. |
| 2010/0318773 A1 | * | 12/2010 | Greyzck .................. G06F 7/02 |
| | | | 712/223 |
| 2011/0252046 A1 | | 10/2011 | Szabo |
| 2013/0086096 A1 | | 4/2013 | Indeck |
| 2014/0095834 A1 | | 4/2014 | Kuo |
| 2015/0199178 A1 | | 7/2015 | Shi |
| 2016/0224552 A1 | | 8/2016 | Han |
| 2017/0011120 A1 | | 1/2017 | Cheung et al. |
| 2017/0024439 A1 | | 1/2017 | Chavan |
| 2017/0077964 A1 | | 3/2017 | Guilford et al. |
| 2017/0185465 A1 | | 6/2017 | Ould-Ahmed-Vall et al. |
| 2018/0004513 A1 | * | 1/2018 | Plotnikov ........... G06F 9/30021 |
| 2018/0189675 A1 | * | 7/2018 | Nurvitadhi .......... G06F 16/2237 |
| 2018/0314722 A1 | | 11/2018 | Li et al. |
| 2019/0325083 A1 | | 10/2019 | Payer |
| 2020/0210181 A1 | * | 7/2020 | Ould-Ahmed-Vall ...................... |
| | | | G06F 9/30123 |
| 2020/0264890 A1 | | 8/2020 | Lichtenau |

OTHER PUBLICATIONS

Abdeen, R., "Start-to-End Algorithm for String Searching", IJCSNS International Journal of Computer Science and Network Security, vol. 11 No. 2, Feb. 2011, pp. 179-182.

Boyer et al., "A Fast String Searching Algorithm", Communications of the ACM, Oct. 1977, vol. 20, No. 10, pp. 762-772.

Faro et al., "Fast Packed String Matching for Short Patterns", 2013 Proceedings of the Fifteenth Workshop on Algorithm Engineering and Experiments, pp. 113-121.

Figuli et al., "Non-Overlapping Substring Detection Within a Data Element String", U.S. Appl. No. 16/109,840, filed Aug. 23, 2018.

Figuli et al., "Plausability-Driven Fault Detection in String Termination Logic for Fast Exact Substring Match", U.S. Appl. No. 16/567,356, filed Sep. 11, 2019.

Figuli et al., "Rapid Substring Detection Within a Data Element String", U.S. Appl. No. 16/109,836, filed Aug. 23, 2018.

Franek et al., "A simple fast hybrid pattern-matching algorithm", Journal of Discrete Algorithms 5 (2007), Available online Jan. 16, 2007, pp. 682-695.

IBM "List of IBM Patents or Patent Applications Treated as Related", Nov. 11, 2019, 2 pages.

Indyk, P., "Faster algorithms for string matching problems: matching the convolution bound", 39th Annual Symposium on Foundations of Computer Science, Nov. 8-11, 1998, 8 pages.

Intel, "Intel 64 and IA-32 Architectures Optimization Reference Manual", Order No. 248966-033, Jun. 2016, 572 pages.

Intel, "Intel SSE4 Programming Reference", Reference No. D91561-003, Jul. 2007, 197 pages.

Karp et al., "Efficient randomized pattern-matching algorithms", IBM Journal Res. Develop., vol. 31, No. 2, Mar. 1987, pp. 249-260.

Knuth et al., "Fast Pattern Matching in Strings", Siam J. Comput., vol. 6, No. 2, Jun. 1977, 28 pages.

Lau, K., "Swift Algorithm Club: Boyer Moore String Search Algorithm", raywenderlich.com, Jun. 30, 2017, 8 pages.

Lin et al., "Non-Overlapping Subsequence Matching of Stream Synopses", IEEE Transactions on Knowledge and Data Engineering, vol. 30, No. 1, Jan. 2018, pp. 101-114.

Mula, W., "SIMD-friendly algorithms for substring searching", Nov. 28, 2016, Updated on Apr. 29, 2017, 16 pages.

Myers, G., "A Fast Bit-Vector Algorithm for Approximate String Matching Based on Dynamic Programming", Journal of the ACM, vol. 46, No. 3, May 1999, pp. 395-415.

Rosettacode.org, "Count Occurrences of a Substring", retrieved from: https://www.rosettacode.org/wiki/Count_occurrences_of_a_substring; last modified Jan. 14, 2018, printed Mar. 8, 2018, 60 pages.

Sitaridi et al., "SIMD-Accelerated Regular Expression Matching", DaMoN '16, Jun. 26, 2016, ACM, pp. 1-7.

Unknown, "Charmatch: Partial String Matching", retrieved from: https://rdrr.io/r/base/charmatch.html; Sep. 22, 2017, 26 pages.

Unknown, "Java String indexOf Parsing", CodingBat code practice, Code Help and Videos, retrieved from: http://codingbat.com/doc/java-string-indexof-parsing.html; Sep. 22, 2017, 3 pages.

Zhang et al., "Fast String Matching With Overlapped Substring Classifier in Deep Packet Inspection Systems", 2010 IEEE Global Telecommunications Conference, Dec. 6-10, 2010, 6 pages.

* cited by examiner

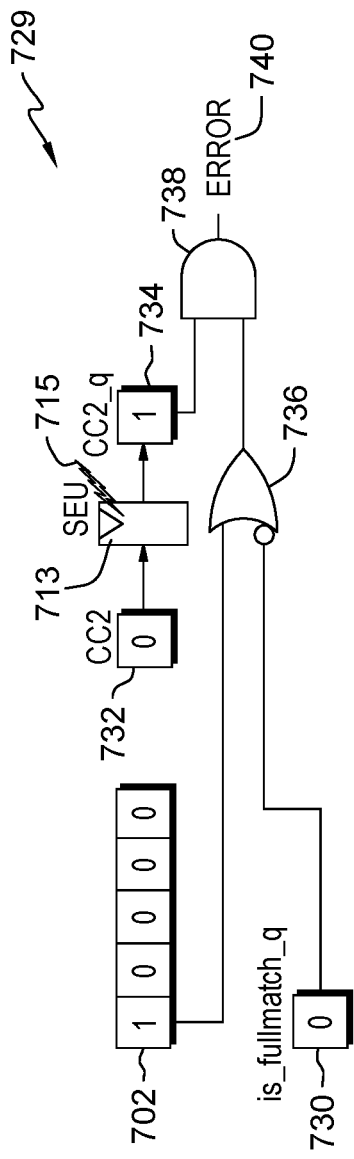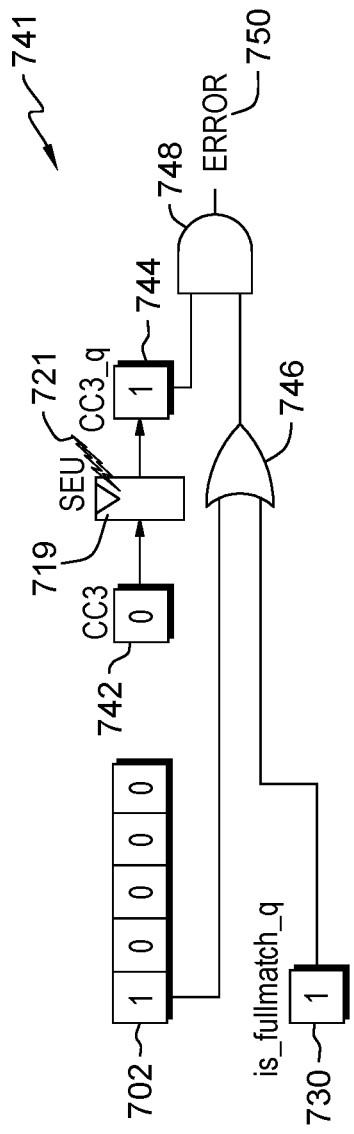

PLAUSABILITY-DRIVEN FAULT DETECTION IN RESULT LOGIC AND CONDITION CODES FOR FAST EXACT SUBSTRING MATCH

BACKGROUND

The present invention relates to the field of digital computer systems, and more specifically, to plausibility-driven fault detection in result logic and condition codes for fast exact substring match using a processor unit for substring searching.

Digital text representations are encoded and stored as strings of binary encoded characters. Widely accepted character encoding standards for computers include American Standard Code for Information Interchange (ASCII) and Unicode Transformation Format (UTF). One of the most common text processing tasks on computers is the substring search or substring match to identify the occurrences of a reference string of characters within a larger target string of characters.

SUMMARY

Embodiments of the present invention are directed to a method for detecting faults in substring search operations. A non-limiting example of the method includes providing, using a processor unit including vector registers of M vector elements each, an M×M matrix of comparators for characterwise comparison of the elements of a reference string stored in a first one of the vector registers and a target string stored in a second one of the vector registers. A vector element is an n-bit element for encoding a character. A resulting bit vector is generated using comparison performed by the M×M matrix. The resulting bit vector indicates characters of the target string that fully match the reference string and indicates characters of the target string that partially match the reference string. Fault detection in the substring search operations is performed by utilizing the resulting bit vector.

Embodiments of the present invention are directed to a processor unit for detecting faults in substring search operations. The processor unit includes a plurality of vector registers of M vector elements each. A vector element is an n-bit element for encoding a character. A non-limiting example of the processor includes an M×M matrix of comparators for characterwise comparison of elements of a first register of the plurality of vector registers storing a reference string and elements of a second register of the plurality of vector registers storing a target string. The M×M matrix is configured to generate a bit vector indicating at least one of characters of the target string that fully match the reference string and characters of the target string that partially match the reference string. The processor also includes a result generating logic for generating using the resulting bit vector an indication of a sub string of the target string that matches a part of the reference string. The indication is of the beginning of the substring and the length of the substring. The processor further includes a fault detection logic for performing fault detection in the substring search operations by utilizing the resulting bit vector.

Embodiments of the present invention are directed to a computer-program product for detecting faults in sub string search operations. The computer-program product including a computer-readable storage medium having program instructions embodied therewith. The program instructions are executable by a processor to cause the processor to perform a method. A non-limiting example of the method includes providing, using a processor unit including vector registers of M vector elements each, an M×M matrix of comparators for characterwise comparison of the elements of a reference string stored in a first one of the vector registers and a target string stored in a second one of the vector registers. A vector element is an n-bit element for encoding a character. A resulting bit vector is generated using comparison performed by the M×M matrix. The resulting bit vector indicates characters of the target string that fully match the reference string and indicates characters of the target string that partially match the reference string. Fault detection in the substring search operations is performed by utilizing the resulting bit vector.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 7A-7D are diagrams illustrating logic to detect faults by checking plausibility of a reported condition code, in accordance with embodiments of the present invention.

Figure 1:
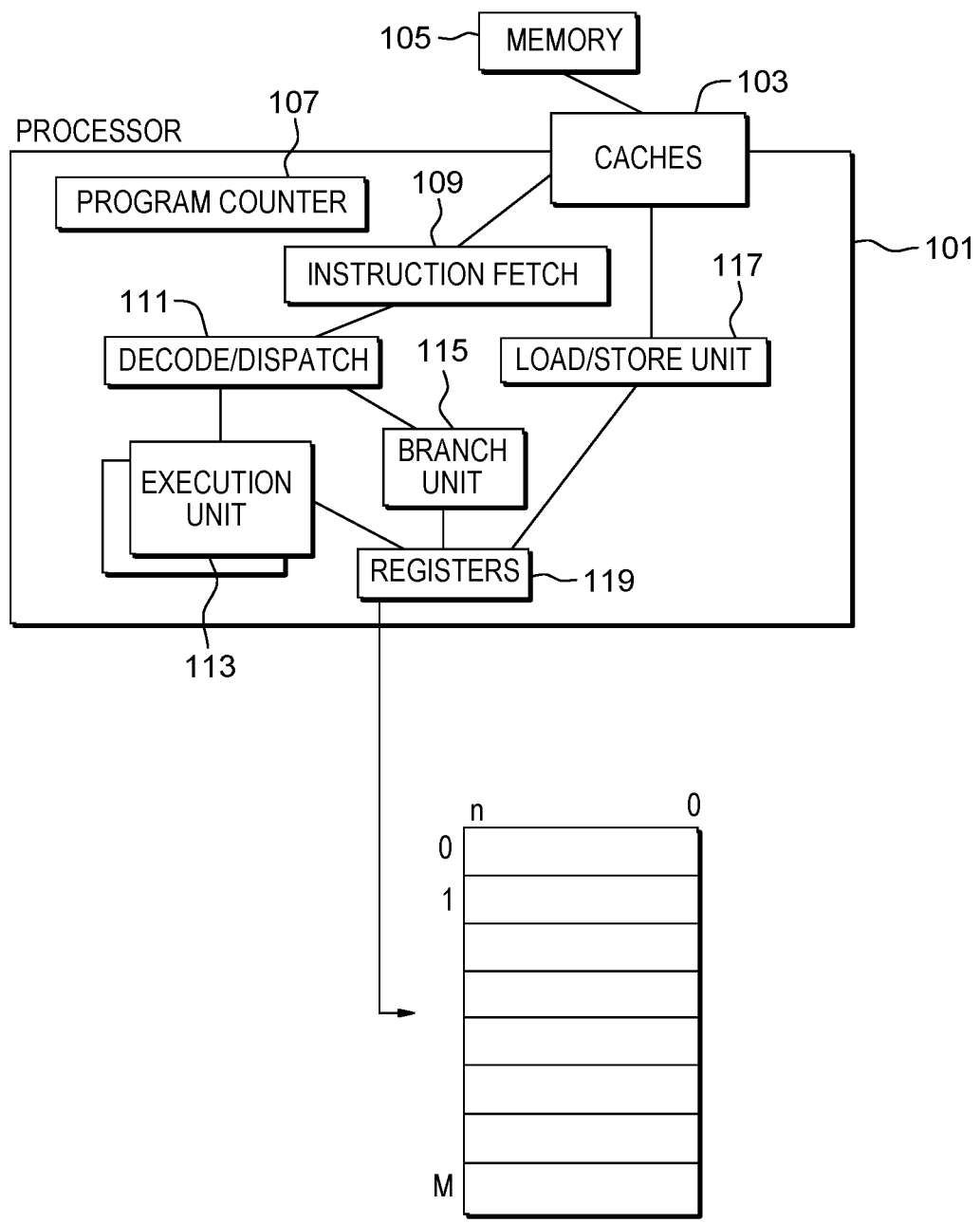
FIG. 1 is an exemplary structure of a processor, in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

As described previously, one of the most common text processing tasks on computers is the sub string search or substring match to identify the occurrences of a reference string of characters within a larger target string of characters. A target string can be generated, for example, based on speech input using a speech transcription process. Generally, the length of the reference string can be specified either implicitly (by zero-termination) or explicitly by an extra operand. Similarly, the target string can be limited by zero termination marking the end of string (EOS). With the ever-increasing pool of information, especially non-structured human readable information, there is a need for faster extraction of textual information and consequently faster methods for solving the substring match problem. Furthermore, there is a need for additional logic that performs cross-checking on internal signals and intermediate results for plausibility. Embodiments of the present invention provide logic that enables plausibility-driven cross-checking on results of substring search and cross-checking on reported condition codes indicating a type of a detected match. By contrast to conventional fault detection techniques, the method presented herein focuses primarily on error detection in the result and condition code logic of SIMD (Single Instruction Multiple Data) substring search engines.

Vector SIMD engines with dedicated instructions for substring search allow the comparison of several characters at the same time with a single instruction, which brings a speed-up in contrast to byte-by-byte comparison. In an exemplary vector SIMD implementation, a vector register has a fixed number of bits (e.g., K bits) that may hold a single vector. The vector register may comprise M vector elements having a respective size of n (i.e., each vector element occupies n bits). The vector register comprises M vector elements of size n. The width of a register refers to the number of vector elements in the register.

The number of characters L is smaller than M. Embodiments of the present invention involve a substring search of the L characters in a target string that may occupy a full vector register (e.g., of M×n bits). The string of L characters may be referred to as a reference string.

The upper triangular part of the comparator matrix comprises the main diagonal and subsequent upper diagonals of the matrix. The lower triangular part of the comparator matrix comprises the main diagonal and subsequent lower diagonals of the matrix.

The term "full match" refers to a substring of L characters of the target string that fully match the reference string. The term "partial match" refers to a substring of one or more characters of the target string that partially match the reference string. Using the upper diagonals may enable identification of the substring of one or more characters at the end of the target string. Using the lower diagonals may enable the identification of the substring of one or more characters at the beginning of the target string.

One or more embodiments of the fast-exact substring match described herein enable exact identification of both, full matches anywhere in the target string and partial match at the end or beginning of the target string. This method does not require re-evaluation (e.g., the substring matching in short strings with contemporary known instructions may require a reevaluation that involves an additional shifting of the operand to be searched in order to find a partial match). For short strings that fit within a vector register, the fast-exact substring match method described herein enables the identification of a substring match with a single operation. This eliminates the re-evaluation phase, when either a full match or a partial match occurs.

Many processor designs, especially when targeted for servers or mainframes, need also to address and incorporate the aspects of RAS (reliability, availability and serviceability). For example, in this context, it may be important to detect and handle physical faults (permanent, transient, intermittent) during runtime.

An error is defined as a deviation from accuracy or correctness which is the manifestation of a fault. To miss capturing the serial data bits by a memory cell because of delay fault or to generate an unexpected value as a result of missing the priority of operators are both error examples.

Similar to faults, an error can be categorized into two types: detected or latent errors. When applying error detection techniques; an error is called a latent error, as long as it has not been recognized. As an example, an error in a single memory bit of a cache entry caused by positive charge and kinetic energy of alpha particles, known as a Single Event Upset (SEU) fault, can be either latent or detected. If the processor recognizes the SEU fault, it is detected; otherwise it keeps its latent status. In addition, a latent error may disappear or be overwritten before it is detected. But, most often many of the errors are propagated and consequently generate more errors or pass through the system which result in single or more failures. A SEU can cause a change of state if it occurs in a latch or flip-flop. The impact of a SEU can be significant as the result of substring search usually affects control flow (condition in if clause). As a non-limiting example, a false positive in a database search due to a SEU can lead to wrong allocation or transfer of resources, assets, and the like.

It will be appreciated that conventional fault detection techniques have numerous limitations in the context of string search engines for SIMD. One conventional technique, duplication of resources is prohibitively expensive with the SIMD architecture. Another fault prevention technique, commercial radiation-hardened processors, is also very expensive both in terms of required area and computing power. Yet other fault detection techniques apply to some operations but not other. For example, residue checking technique works only for numeric computations, while parity determination is limited to single or odd bit errors and protects only data but not computations.

FIG. 1 is an exemplary structure of a processor 101. For example, one or more levels of cache 103 are employed to buffer memory data in order to improve processor performance. The cache 103 is a high-speed buffer holding cache lines of memory data that are likely to be used. Typical cache lines are 64, 128 or 256 bytes of memory data. Cache 103 is caching data of higher hierarchical storage being main memory storage 105.

A program counter (instruction counter) 107 keeps track of the address of the current instruction to be executed. A program counter in a z/Architecture processor is 64 bits and can be truncated to 31 or 24 bits to support prior addressing limits. A program counter may typically be embodied in a program status word (PSW) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. The program counter 107 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 107.

Typically, an instruction fetch unit 109 is employed to fetch instructions on behalf of the processor 101. The fetch unit 109 either fetches "next sequential instructions", target instructions of branch taken instructions, or first instructions of a program following a context switch. Examples of instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 101. For example, the fetched instruction(s) are passed to a dispatch unit 111 of the fetch unit. The dispatch unit 111 decodes the instruction(s) and forwards information about the decoded instruction(s) to appropriate units 113, 115, 117. An execution unit 113 may typically receive information about decoded arithmetic instructions from the instruction fetch unit 109 and may perform arithmetic operations on operands according to the opcode of the instruction. Operands are provided to the execution unit 113 preferably either from memory 105, vector registers 119 or from an immediate field of the instruction being executed. Results of the execution, when stored, are stored either in memory 105, vector registers 119 or in other machine hardware (such as control registers, PSW registers and the like).

As shown in FIG. 1, vector registers 119 may have a same size K, where K=M×n and n is the number of bits that encodes a single character (e.g., n=8 bits). For example, each of the vector registers 119 may store K bits. M may be the width of the register.

The data stored in the vector registers 119 may for example be processed using a parallel vector processing technique, e.g., using Single Instruction Multiple Data (SIMD) hardware, e.g., vector registers 119 may hold data for vector processing done by SIMD instructions.

For example, fixed-sized chunks of bytes known as words may be transferred from the memory 105 to the vector register 119. The number of bits in a word may, for example, be equal or smaller than the size K of the register 119. For example, vector load/store instructions provide the ability to take the words stored in memory 105 and pack them into sequential vectors/streams to be placed in vector registers 119. For example, the memory 105 may be configured to comprise 256-bit memory words. A 256-bit memory word may be partitioned into chunks of K bits. During processing, each K-bit chunk (containing M characters) is loaded into a register 119.

Figure 2:
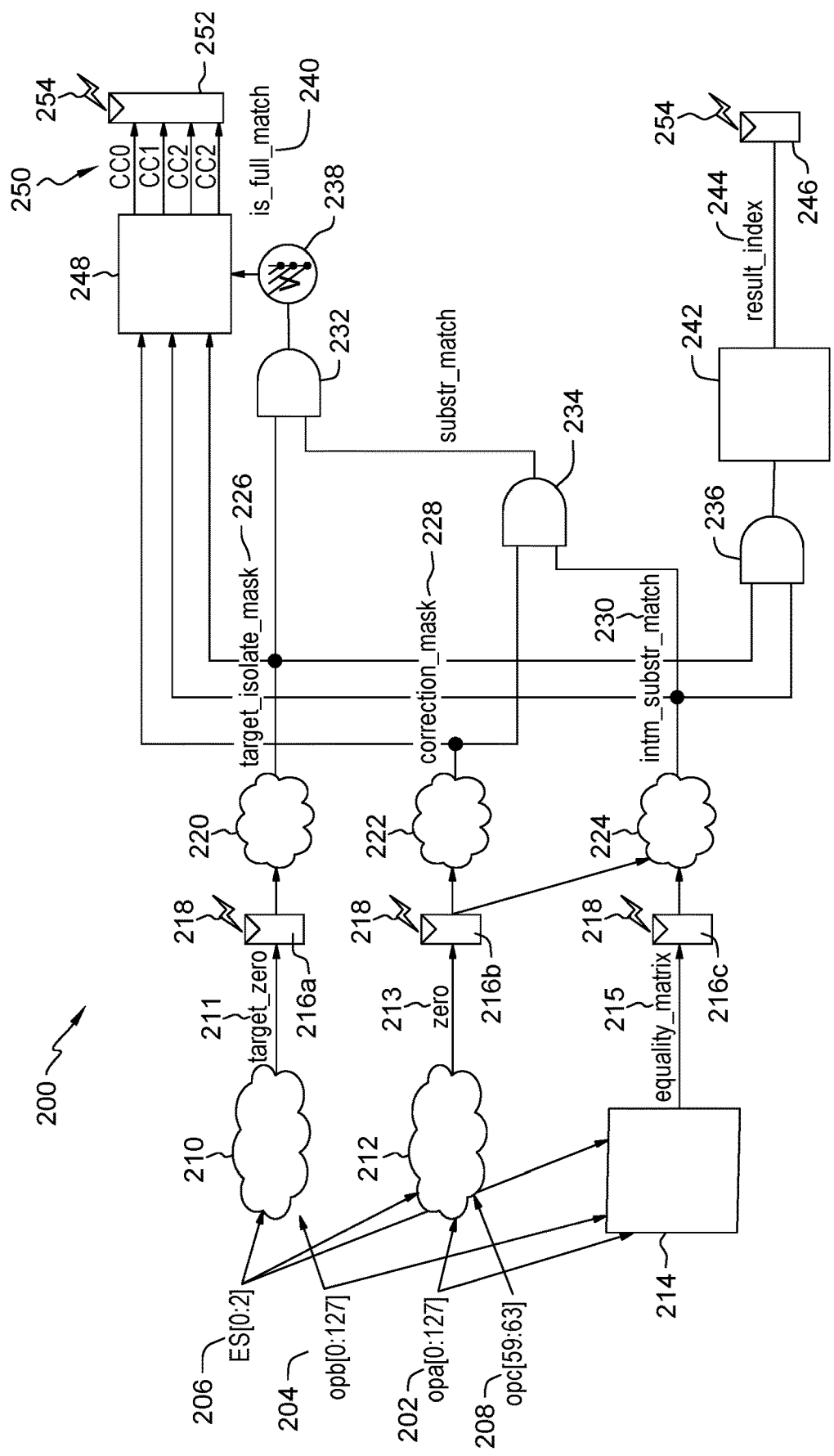
FIG. 2 is a diagram illustrating components of a processing unit in accordance with embodiments of the present invention.

FIG. 2 is a diagram illustrating components of a processing unit 200 in accordance with one or more embodiments of the present invention. The processing unit 200 may be configured to operate on an entire vector in one instruction. The processing unit 200 may be part of the execution units 113 of FIG. 1.

The processing unit 200 comprises a comparator matrix 214. The comparator matrix 214 may be a hardware comparator matrix. The comparator matrix 214 may be configured to compare individual characters. The comparator matrix 214 comprises comparators, such as character-wise equality comparators. In addition to or alternative to the equality comparison, the comparators may be configured to perform a combination of '>' and '<' operators e.g. operation: NOT((r>t) OR (r<t))=(r==t).

The comparator matrix 214 may operate on two operands a and b. Operand a 202 may, for example, be a reference string to be searched, operand b 204 may be a target string that is checked if it contains all and/or part of the operand a 202. The reference string may comprise L characters and the target string may comprise M characters which may occupy a full vector register 119. The target and reference strings are compared character-by-character (character-wise). A third operand, operand c 208, is utilized by a zero detect logic 212 to generate a zero detect vector which is applied by logic 224 on the result of the comparator matrix 214. The operand c (explicit length) 208 may have, for instance, five bits, 59-63. For instance, the search of a reference string "noon" within a target string "abhighnoonoonnoo" with explicit length of the reference string equal to 4 (c=4) returns result=0000001001000100. The '1's in the seventh and tenth bits from left originate from a full match, yet the '1' in the third bit from the right originates from a partial match.

An element size control 206 having, for instance, three bits, 0-2, specifies an element size. The element size control 206 specifies the size of the elements in the vector register operands. In one example, the element size control 206 can specify a byte, halfword (e.g., 2 bytes) or word (e.g., 4 bytes). For instance, a 0 indicates a byte; a 1 indicates a halfword; and a 2 indicates a word, a.k.a., full word. Each element can contain the encoded data within a stream of UTF-8 (one byte/character), UTF-16 (2 bytes/character) or UTF-32 (4 bytes/character) code units.

Since the vectors register's width, M=16, is higher than the number L=4 of characters of the reference string "noon", the vector register that stores the reference string may comprise empty elements. For instance, the first 4 characters in the reference string 202 may represent the word "noon", yet the trailing 4-12 characters are empty and may be represented by 0x00 in the character encoding. A first zero detect logic 210 and a second zero detect logic 212 may be configured for generating a first zero detect vector 211 and a second zero detect vector 213, respectively. The first zero detect vector 211 has values indicative of empty elements of the target string and the non-empty elements of the target string and the second zero detect vector 213 has values indicative of empty elements of the reference string and the non-empty elements of the reference string.

In one embodiment, an output of the comparator matrix 214 may comprise an equality matrix 215. The equality matrix 215 has values indicative of the equality relationship between the compared characters. As shown in FIG. 2, the first zero detect vector 211, the second detect vector 213 and the equality matrix 215 may be inputted into corresponding flip-flops 216a, 216b and 216c, respectively.

According to an embodiment of the present invention, the processing unit 200 may further include fault detection logic. The fault detection logic includes a register for storing an anticipated intermediate result vector 230, a register comprising a correction mask 228, a register comprising a target isolation mask 226 and a logic for performing AND operations between corresponding elements of the registers. In one example, the three registers may not be part of the fault detection logic. Utilization of the correction logic 222 to generate the correction mask 228 may enable a simplified method for suppressing the indication of the partial match or the indication of the full match in the anticipated intermediate result vector 230. In contrast to the conventional art, the processing unit 200 distinguishes between full match and partial match at the hardware level. This may be achieved by applying the correction mask 228, generated by the correction logic 222, on the anticipated intermediate result vector 230 that may contain a partial match at the end of a string fragment. The anticipated intermediate result vector 230 cannot distinguish between full match and partial match. For example, if the operand b comprises operand a and part of operand a, the intermediate result vector 230 comprises a bit value at a bit position that marks the beginning of a sub string of the operand b that fully matches the operand a and another bit value at another bit position marking the beginning of a sub string of the operand b that partially matches the operand a.

The fault detection logic may also include a first AND gate 234 for performing an AND operation between the correction mask 228 and the intermediate result vector 230. The output of the AND gate 234 may be used as an input to a second AND gate 232. The target isolation mask 226 may be generated using target isolation logic 220 and may be used as another input to the second AND gate 232. The fault detection logic may further include a third AND gate 236 for performing an AND operation between the intermediate result vector 230 and the target isolation mask 226.

According to an embodiment of the present invention, a result generating logic may be realized, for instance, by an or-tree 238 over the bits of the output of the second AND gate 232. An output of the or-tree 238 provides an indication of the full match results 240. As noted herein, the full match refers to a substring of L characters of the target string that fully match the string. The output of the third AND gate 236 is fed to a leading zero counter 242. The leading zero counter 242 returns a result index 244 by determining the number of leading zeros in a resulting bit vector. The result index 244 indicates index of a first match. Thus, for example, the search of a reference string "noon" within a target string "abhighnoonoonnoo" returns the result index value equal to 6 (since, 6$^{th}$ bit of the target string is the first match). The result index 244 may be stored in a flip-flop 246.

According to an embodiment of the present invention, the result generating logic may further return condition code 250 along with the result index 244. Exemplary condition codes are illustrated in the following table:

| Condition Code | Meaning |
| --- | --- |
| CC0 | No match, no partial match, no end-of-string (EOS) |
| CC1 | No match, no partial match but implicit EOS termination |
| CC2 | Full match was found |
| CC3 | Partial match was found but no full match |

In one embodiment, the condition code 250 may be generated by a condition code generator 248 based on a combination of the following inputs: the target isolation mask 226, the correction mask 228 and the anticipated intermediate result based on the indication of the full match results 240. In one embodiment, the condition code generator 248 may comprise a decoder. The generated condition code 250 may be stored in a corresponding flip-flop 252. As shown in FIG. 2, SEU faults 218, 254 may affect any of the fault detection logic flip-flops 216a, 216b, 216c and any of the result generating logic flip-flops 246, 252.

Figure 3:
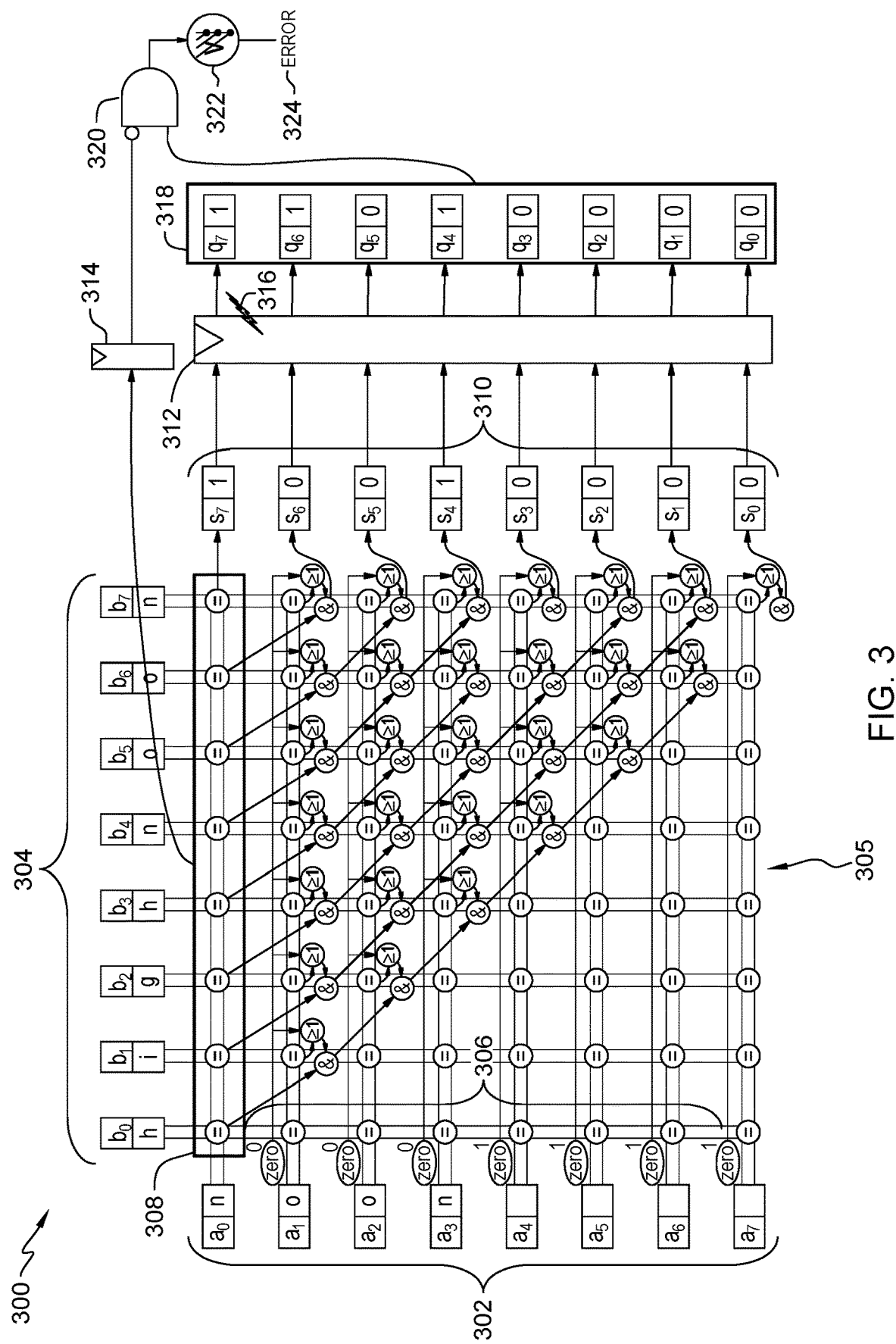
FIG. 3 is a diagram illustrating logic to detect faults by comparing a resulting bit vector with a first row of comparison matrix, in accordance with embodiments of the present invention.

FIG. 3 is a diagram illustrating logic to detect faults by comparing a resulting bit vector with a first row of comparator matrix, in accordance with embodiments of the present invention. As noted herein, the comparator matrix 305 may operate on two operands a 202 and b 204. The first row 308 of the comparator matrix 305 would contain bit values set to 1 in positions where the first character of the reference string matches one of the characters of the target string. A fault detection logic 300 is configured to detect an error when, the resulting bit vector 310 indicates a match at a particular position but the respective character of the target string and the first character of the reference string do not match at that particular position. The fault detection logic 300 may further generate a zero detect vector 306.

The comparator matrix 305 is configured to compare individual characters of each operand 302 and 304. The comparator matrix 305 comprises comparators, such as character-wise equality comparators. The resulting bit vector 310 indicates results of the performed sub string search and contains bit values set to 1 where the reference string matches a sequence of characters of the target string. The resulting bit vector 310 may indicate any of a full match, partial match and overlapping match. A flip-flop 312 stores the resulting bit vector 310. At some point, the flip-flop 312 may be subject to a SEU event 316 as a result of exposure to radiation consisting of alpha particles or neutrons, for example. As a result, the output 318 of the flip-flop 312 may have at least one of the bits flipped (for example, the bit at the position $q_6$).

As shown in FIG. 3, another flip-flop 314 stores the first row 308 of the comparator matrix 305. The fault detection logic 300 includes an AND gate 320. All bits stored in the flip-flop 314 are inverted and fed into the AND gate 320. Another input of the AND gate 320 is the output 318 of the flip-flop 312. The output of the AND gate 320 is connected to an OR tree 322. It should be noted that the OR tree 322 generates a value of 1 only if the resulting bit vector 318 is not a subset of the first row 308 of the comparator matrix 305. In this case, since the bit at the position $q_6$ of the output 318 is set to 1, the value at the corresponding position of the first row 308 is set to 0, indicating no match of the first character, which is inverted to 1 at the input of the AND gate 320. Since the second input of the AND gate 320 (value of the resulting bit vector element $q_6$) is also 1, the OR tree 322 outputs 1, indicating a fault 324. The fault detection logic 300 is configured to check plausibility of the resulting bit vector 310 and to detect faults when the resulting bit vector 310 is different from a subset of the first row 308 of the comparator matrix 305.

Figure 4:
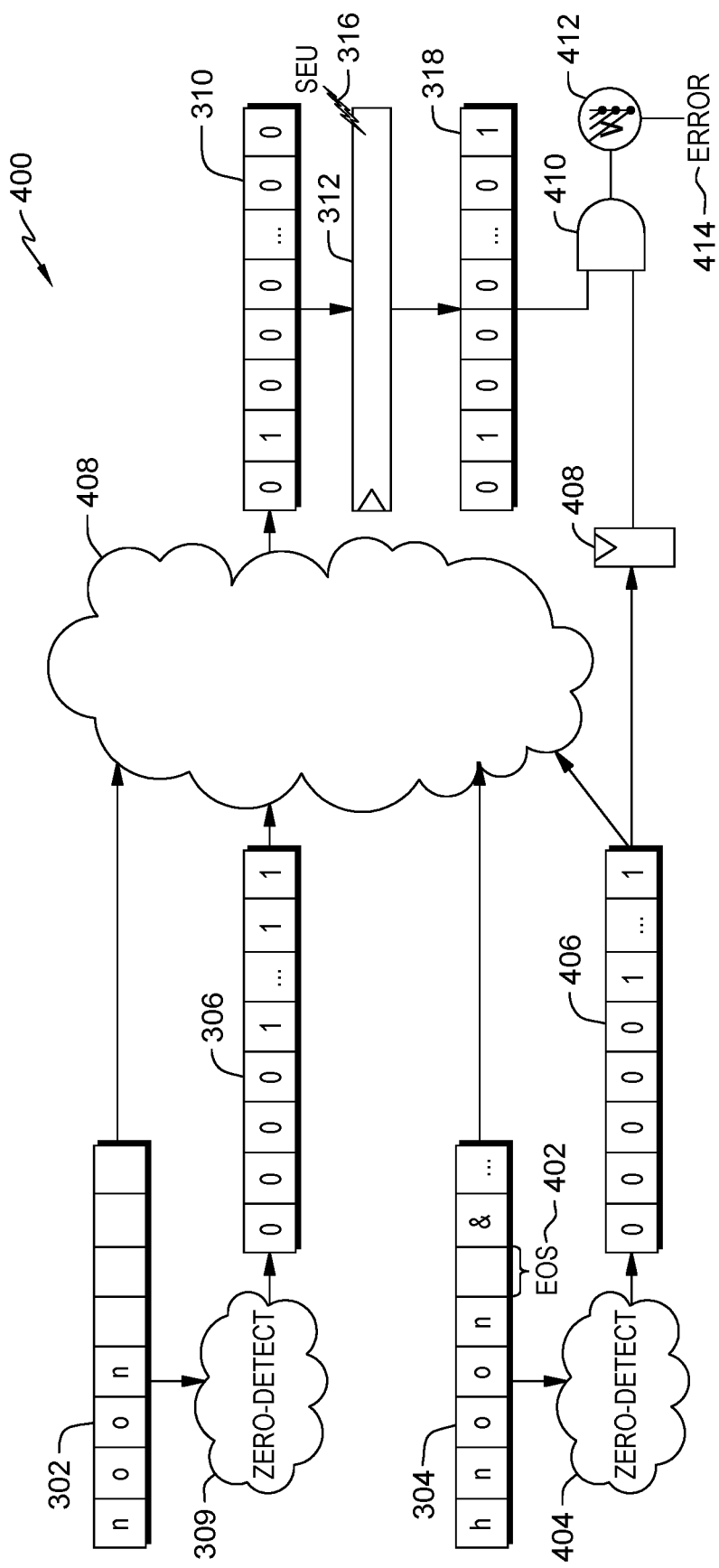
FIG. 4 is a diagram illustrating logic to detect faults by comparing the resulting bit vector with a zero detect vector associated with a target string, in accordance with embodiments of the present invention.

FIG. 4 is a diagram illustrating logic to detect faults by comparing the resulting bit vector with a zero detect vector associated with a target string, in accordance with embodiments of the present invention. According to an embodiment of the present invention, a first zero detect logic 309 processes information contained in the operand a 302 to generate a first zero detect vector 306 associated with the reference string. In the illustrated case, all bits of the first zero detect vector 306 starting with the fifth position are set to 1. A second zero detect logic 404 processes information contained in the operand b 304 to generate a second zero detect vector 406 associated with the target string. In the illustrated case, since the target string contained in the operand b 304 is implicitly terminated (contains an end of string character 402), all bits of the second zero detect vector 406 are set to 1 starting with the position corresponding to the end of string character 402. A flip-flop 408 stores the second zero detect vector 406.

A substring search logic 408 is configured to compare individual characters of each operand 302 and 304 using the first zero detect vector 306 and the second zero detect vector 406. The substring search logic 408 generates the resulting bit vector 310 which is stored at the flip-flop 312. At some point, the flip-flop 312 may be subject to a SEU event 316 as a result of exposure to radiation consisting of alpha particles or neutrons, for example. As a result of the occurred SEU event 316, the output 318 of the flip-flop 312 may have at least one of the bits flipped. In the illustrated case, the last bit of the output 318 is flipped. It is noted that the flipped bit is positioned beyond the end of the target string indicated by the end of string character 402.

The fault detection logic 400 includes an AND gate 410. The content of the flip-flop 408 is fed to the AND gate 410 as one of the inputs. The SEU affected output 318 comprises another input of the AND gate 410. The fault detection logic 400 further includes an OR tree 412 for checking the output of the AND gate 410. In this case, the OR tree 412 generates a value of 1 only if a bit position within the resulting bit vector of the bit indicating the match is higher than a bit position within the zero detect vector of the bit indicating the terminating element (EOS element) of the target string. In this case, since the last bit of the SEU affected output 318 is set to 1 and the last bit of the second zero detect vector 406 is set to 1, the value generated by the OR tree 412 is 1, indicating a fault 414. The fault detection logic 400 is configured to check plausibility of the resulting bit vector 310 and to detect faults when the output of the resulting bit vector 318 indicates a match at a position beyond the implicit or explicit termination of the target string.

Figure 5:
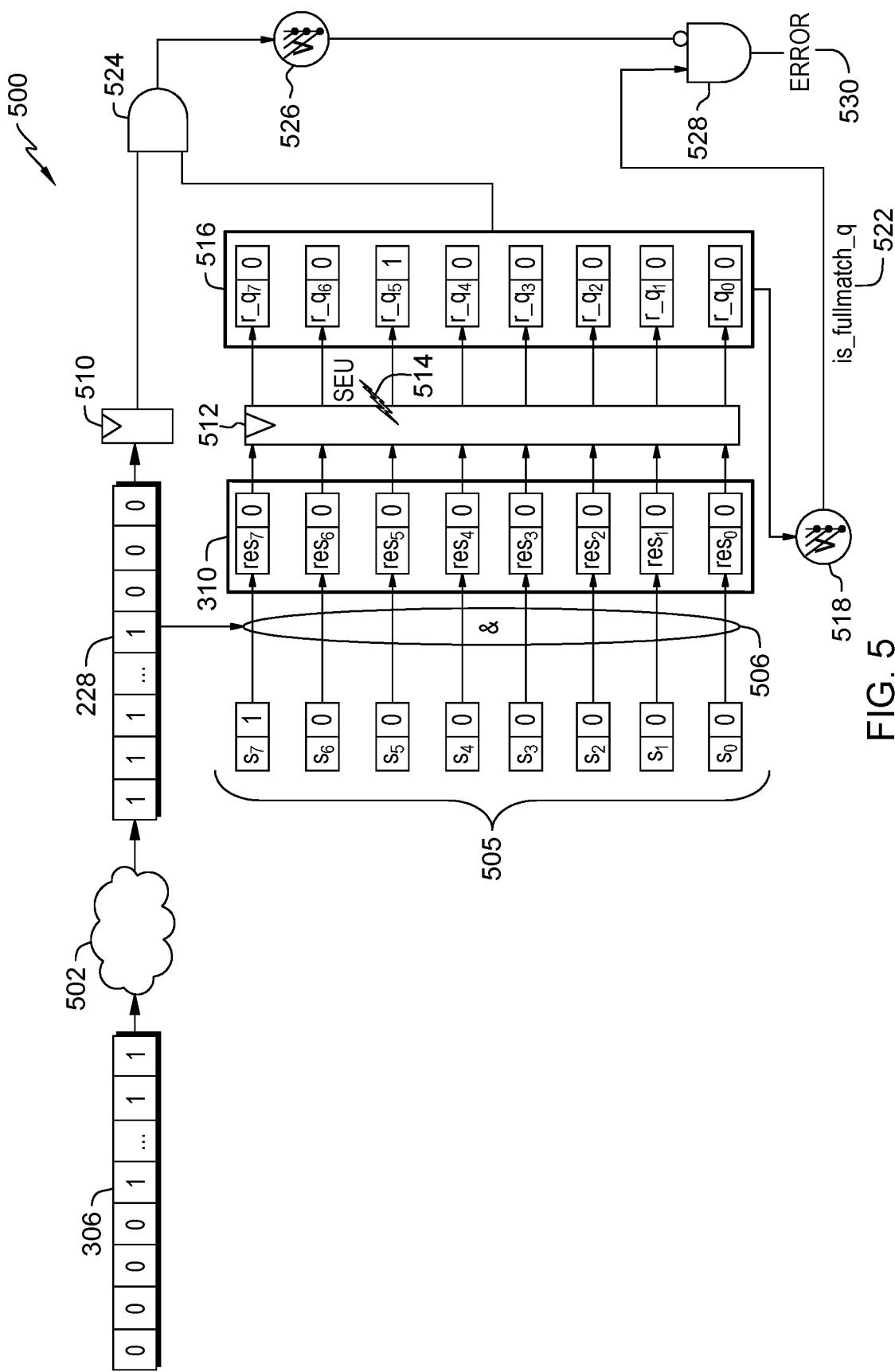
FIG. 5 is a diagram illustrating logic to detect faults by comparing a reported match-type with the resulting bit vector and a matchable region, in accordance with embodiments of the present invention.

FIG. 5 is a diagram illustrating logic 500 to detect faults by comparing the resulting bit vector with a matchable region associated with a target string, in accordance with embodiments of the present invention. According to an embodiment of the present invention, a zero detect logic processes information contained in the operand to generate a zero detect vector 306 associated with the reference string. In the illustrated case, since the string contained in the operand a 202 contains 4 characters, all bits of the first zero detect vector 306 starting with the fifth position are set to 1. According to an embodiment of the present invention, the logic 500 may further include correction logic 502. The correction logic 502 comprises logic for generating a correction mask 228. The correction mask 228 is stored in a flip-flop 510. Utilization of the correction mask 228 enables a simplified method for suppressing the indication of the partial match or the indication of the full match in a resulting bit vector 310. As noted herein, an anticipated intermediate result 505 cannot distinguish between full matches and partial matches. To suppress partial matches from the anticipated intermediate result 505 the correction mask 228 may be applied 506 on the anticipated intermediate result 505 that may contain a partial match at the end of a string fragment. In the illustrated case, the correction mask 228 represents a matchable region. As used herein, the term "matchable region" represent a region where full match is possible. All bits of the matchable region within the correction mask 228 are set to 1. Since in the illustrated case the reference string contains four characters, the matchable region includes all bits except the last three.

After the correction mask 228 is applied 506 on the anticipated intermediate result 505, the resulting bit vector 310 contains only indications of full matches. Since in the illustrated case the anticipated intermediate result 505 contained only partial matches indicated by bit $s_7$ set to 1, the applied bit mask 228 sets all bits of the resulting bit vector 310 to 0s.

The resulting bit vector 310 is stored at the flip-flop 512. At some point, the flip-flop 512 may be subject to a SEU event 514. As a result of the occurred SEU event 514, the output 516 of the flip-flop 512 may have at least one of the bits flipped. In the illustrated case, the third bit from last of the output 516 is flipped. It is noted that the flipped bit is positioned outside of the matchable region.

The fault detection logic 500 includes an AND gate 524. The content of the flip-flop 510 is fed to the AND gate 524 as one of the inputs. The SEU affected output 516 comprises another input of the AND gate 524. The fault detection logic 500 further includes a first OR tree 526 over the bits of the output of the AND gate 524. The OR tree 526 generates a value of 1 only if a match indicating the bit position within the resulting bit vector is within a matchable region. In this case, since the output of the AND gate 524 is 0, the value generated by the OR tree 526 is also 0.

As shown in FIG. 5, the fault detection logic 500 further includes a second OR tree 518 over the bits of the output 516 of the flip-flop 512. Since bit 5 of the output 516 of the flip-flop 512 is set to 1, the output of the second OR tree 518 is also 1. This output comprises a full match indicator 522. The full match indicator 522 is fed into yet another AND gate 528. The output of the first OR tree 526 is inverted and used as another input of the AND gate 528. The output of the AND gate 528 indicates a fault 530. The fault detection logic 500 is configured to check plausibility of the output 516 of the flip-flop 512 and to detect faults when this output indicates a full match, while at the same time all bits of the matchable region within the output 516 of the flip-flop 512 are set to 0.

Figure 6:
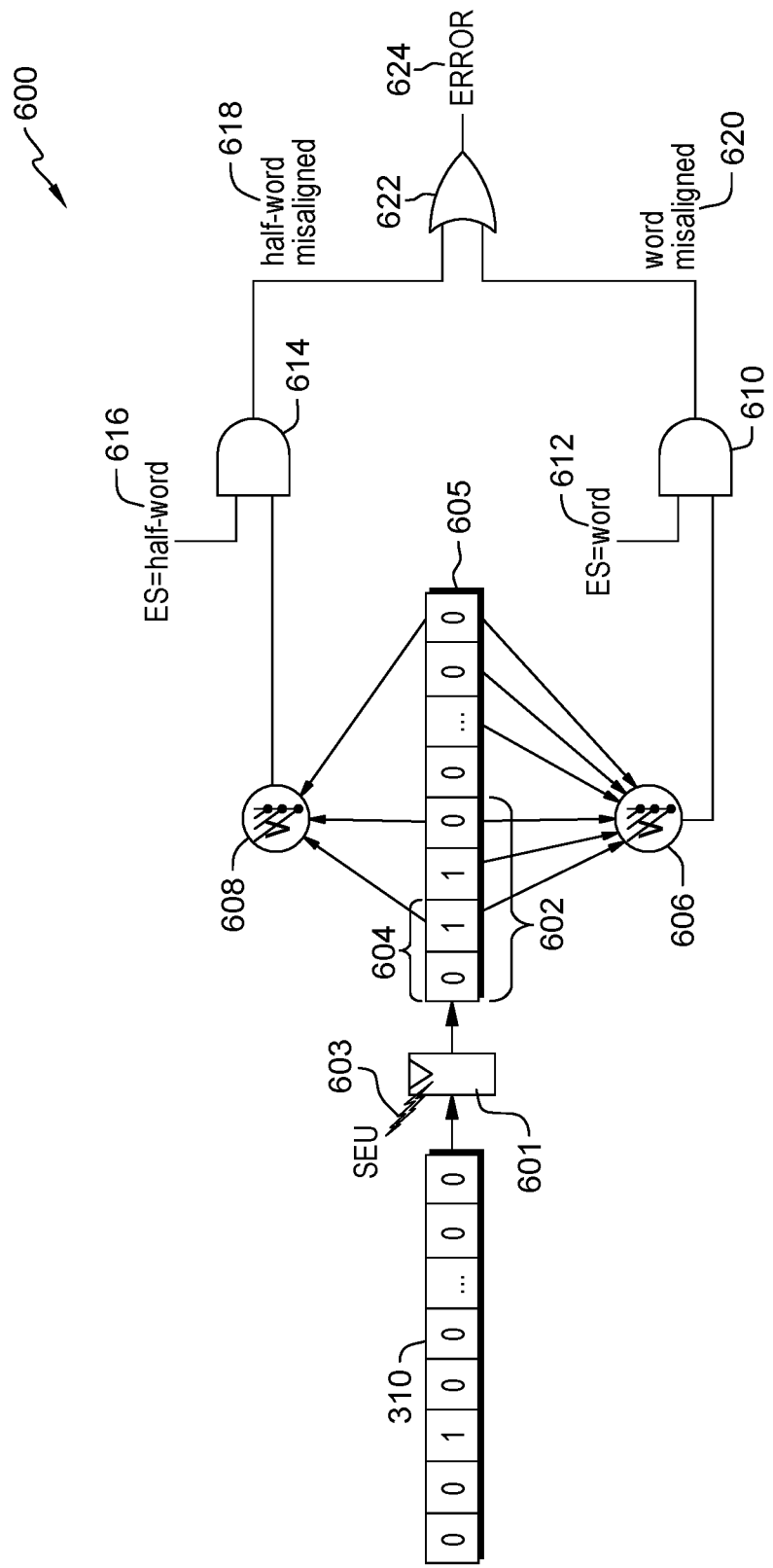
FIG. 6 is a diagram illustrating logic to detect faults by comparing the resulting bit vector with an element size, in accordance with embodiments of the present invention.

FIG. 6 is a diagram illustrating a misalignment detection logic 600 that includes logic to detect faults when a resulting bit vector is not aligned with an element size, in accordance with embodiments of the present invention. For illustrative purposes only, it is assumed that characters are encoded using UTF-16 encoding scheme, which is a non-ASCII transparent byte serialized encoding scheme that may be either big-endian (BE) or little-endian (LE) and, thus, defines the order of the bytes in the encoding scheme. Each character is encoded using 2 bytes. In this example, only the third byte of an exemplary resulting bit vector 310 is set to 1, all of the remaining bytes are set to 0. A flip-flop 601 stores the resulting bit vector 310. At some point, the flip-flop 601 may be subject to a SEU event 603. A misalignment in the resulting bit vector 310 occurs if at least one byte other than first byte of each element is set to 1.

In order to detect this misalignment between the resulting bit vector 310 and a corresponding element size, a misalignment detection logic 600 includes circuit elements to detect element misalignments having at least word or half-word element sizes. The misalignment detection logic 600 is configured to process the output 605 at the flip-flop 601 storing the resulting bit vector 310. To process the output 605 of the flip-flop 601 having half-word elements 604, the misalignment detection logic 600 includes a first OR tree 608 over respective second bytes of each half-word. Only first bytes of each word are expected to have values of 1. The output of the first OR tree 608 is connected to an input of an AND gate 614. Another input of the AND gate 614 is an element size indicator 616. The element size indicator 616 contains value indicating that each element of the resulting bit vector has a size of 2 bytes. Output of the AND gate 614 is indicative of whether there is any misalignment with respect to elements of the resulting bit vector 310 when each element has a size of half-word. In this case, since the second byte of the first half-word element 604 is erroneously set to 1, the output of the OR tree 608 is 1. As a result, the AND gate 614 also produces 1, indicating misalignment 618 of the resulting bit vector 310 having half-word elements.

The misalignment detection logic 600 may also include circuit elements to process the output 605 at the flip-flop 601 storing the resulting bit vector 310 when each element of the vector 605 is a word (4 bytes). The misalignment detection logic 600 includes a second OR tree 606 over second through fourth bytes of each word. The output of the second OR tree 606 is connected to an input of a second AND gate 610. Another input of the second AND gate 610 receives an element size indicator 612. The element size indicator 612 contains value indicating that each element of the resulting bit vector 310 is 4 bytes long. The output of the second AND gate 610 is indicative of whether there is any misalignment with respect to elements of the resulting bit vector 310 when each element has a size of a word. In this case, since both the second and third bytes of a first word 602 are set to 1, the output of the second OR tree 606 is 1. As a result, the second AND gate 610 also produces 1, indicating misalignment 620 of the resulting bit vector 310 having word elements. An OR gate 622 compares outputs of respective AND gates 610 and 614 to indicate a corresponding misalignment error 624 if at least one of the AND gates 610 and 614 generates 1.

FIGS. 7A-7D are diagrams illustrating logic to detect faults by checking plausibility of a reported condition code, in accordance with embodiments of the present invention. According to embodiments of the present invention, the result generating logic may generate one of the condition codes along with the result index indicating the index of a first match. Thus, for example, the search of a reference string "noon" within a target string "abhighnoonoonnoo" returns the result index value equal to 6 (since, 6$^{th}$ bit of the target string is the first match). Exemplary values of condition codes are repeated here for illustrative purposes only: CC0—no full match, no partial match and no EOS was detected; CC1—no full match, no partial match but implicit EOS termination was detected; CC2—full match was found; CC3—partial match but no full match was found.

Figure 7A:
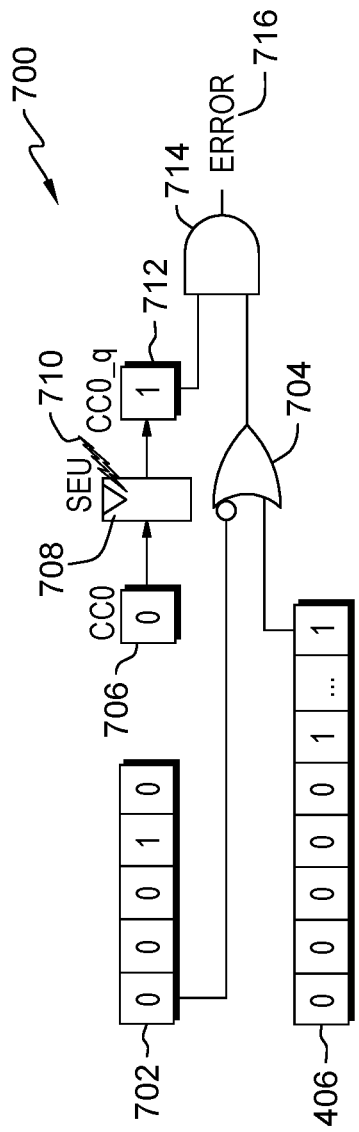

FIG. 7A illustrates logic 700 to detect errors by checking plausibility of a reported CC0 condition code 706 by comparing the reported condition code with the result index 702 and the zero detect vector 406. The value of the condition code CC0 706 is stored at the flip-flop 708. At some point, the flip-flop 708 may be subject to a SEU event 710. As a result of the occurred SEU event 710, the output 712 of the flip-flop 708 may be flipped. In the illustrated case, the flipped value of 1 indicates that no full match, no partial match and no EOS was detected.

As shown in FIG. 7A, the fault detection logic 700 further includes an OR gate 704 for processing values of the result index 702 and the zero detect vector 406 associated with the target string. With the vector size being powers of 2 it is sufficient to examine the most significand bit (MSB) of the result index. This bit will be 0 if a match was found and 1 if no match was found. The MSB of the result index 702 is fed into the OR gate 704, where the value of the MSB of the result index 702 is inverted. In this case, value of the MSB of the result index 702 is inverted to 1 and the output of the OR gate 704 is 1. A second input of the OR gate 704 is connected to the least significand bit (LSB) of the zero detect vector 406. This LSB is set to 1 when an EOS is detected. Thus in both cases, either a match is found or an EOS is detected, the output of the OR gate 704 is 1. The output of the OR gate 704 is connected to one input of an AND gate 714. The SEU affected output 712 of the flip-flop 708 is used as another input of the AND gate 714. The output of the AND gate 714 indicates a fault 716. The fault detection logic 700 is configured to check plausibility of the reported CC0 condition code 706 and to detect faults when the CC0 code is reported despite the result generating logic detecting a match or an EOS.

Figure 7B:
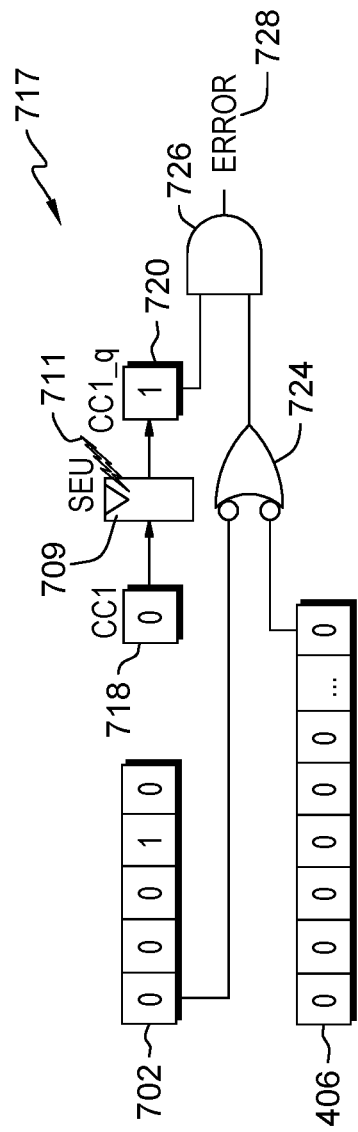

FIG. 7B illustrates logic 717 to detect errors by checking plausibility of a reported CC1 condition code 718 by comparing the reported condition code with the result index 702 and the zero detect vector 406. The value of the condition code CC1 718 is stored at the flip-flop 709. At some point, the flip-flop 709 may be subject to a SEU event 711. As a result of the occurred SEU event 711, the output 720 of the flip-flop 709 may be flipped. In the illustrated case, the flipped value of 1 indicates that no full match, no partial match but explicit EOS termination was detected.

As shown in FIG. 7B, the fault detection logic 717 further includes an OR gate 724 for processing values of the result index 702 and the zero detect vector 406 associated with the target string. With the vector size being powers of 2 it is sufficient to examine the most significand bit (MSB) of the result index. This bit will be 0 if a match was found and 1 if no match was found. These MSB of the result index 702 is fed into the OR gate 724, where it is inverted. In this case, the value of the MSB of the result index 702 is inverted to 1 and the output of the OR gate 724 is 1. A second inverted input of the OR gate 724 is connected to the least significand bit (LSB) of the zero detect vector 406. This LSB is set to 0 when no EOS is detected. Thus in both cases, either a match is found or no EOS is detected, the output of the OR gate 724 is 1. The output of the OR gate 724 is connected to one input of an AND gate 726. The SEU affected output 720 of the flip-flop 709 is used as another input of the AND gate 726. The output of the AND gate 726 indicates a fault 728. The fault detection logic 717 is configured to check plausibility of the reported CC1 condition code 718 and to detect faults when the CC1 code is reported despite the result generating logic detecting a match or not detecting an EOS.

FIG. 7C illustrates logic 729 to detect errors by checking plausibility of a reported CC2 condition code 732 by comparing the reported condition code with the result index 702 and a match type indicator. The value of the condition code CC2 732 is stored at the flip-flop 713. At some point, the flip-flop 713 may be subject to a SEU event 715. As a result of the occurred SEU event 715, the output 734 of the flip-flop 713 may be flipped. In the illustrated case, the flipped value of 1 indicates that a full match was detected.

As shown in FIG. 7C, the fault detection logic 729 further includes an OR gate 736 for processing values of the result index 702 and a match indicator 730. In this embodiment, the match indicator with a value of 1 indicates that a full match was detected. The values of the MSB of the result index 702 and the match indicator 730 are fed into the OR gate 736, where the value of the match indicator 730 is inverted. In this case, since both inputs have non-zero values, the output of the OR gate 736 is 1. The output of the OR gate 736 is connected to one input of an AND gate 738. The SEU affected output 734 of the flip-flop 713 is used as another input of the AND gate 738. The output of the AND gate 738 indicates a fault 740. The fault detection logic 729 is configured to check plausibility of the reported CC2 condition code 732 and to detect faults when the CC2 code is reported despite the result generating logic detecting only a partial match or no match at all.

FIG. 7D illustrates logic 741 to detect errors by checking plausibility of a reported CC3 condition code 742 by comparing the reported condition code with the result index 702 and a match type indicator. The value of the condition code CC3 742 is stored at the flip-flop 719. At some point, the flip-flop 719 may be subject to a SEU event 721. As a result of the occurred SEU event 721, the output 744 of the flip-flop 719 may be flipped. In the illustrated case, the flipped value of 1 indicates that a partial match but not a full match was detected.

As shown in FIG. 7D, the fault detection logic 741 further includes an OR gate 746 for processing values of the MSB of the result index 702 and a match indicator 730. In this embodiment, the match indicator with a value of 1 indicates that a full match was detected. The values of the MSB of the result index 702 and the match indicator 730 are fed into the OR gate 746. In this case, since both inputs have non-zero values, the output of the OR gate 746 is 1. The output of the OR gate 746 is connected to one input of an AND gate 748. The SEU affected output 744 of the flip-flop 719 is used as another input of the AND gate 748. The output of the AND gate 748 indicates a fault 750. The fault detection logic 741 is configured to check plausibility of the reported CC3 condition code 742 and to detect faults when the CC3 code is reported despite the result generating logic detecting a full match or no match at all.

Figure 8:
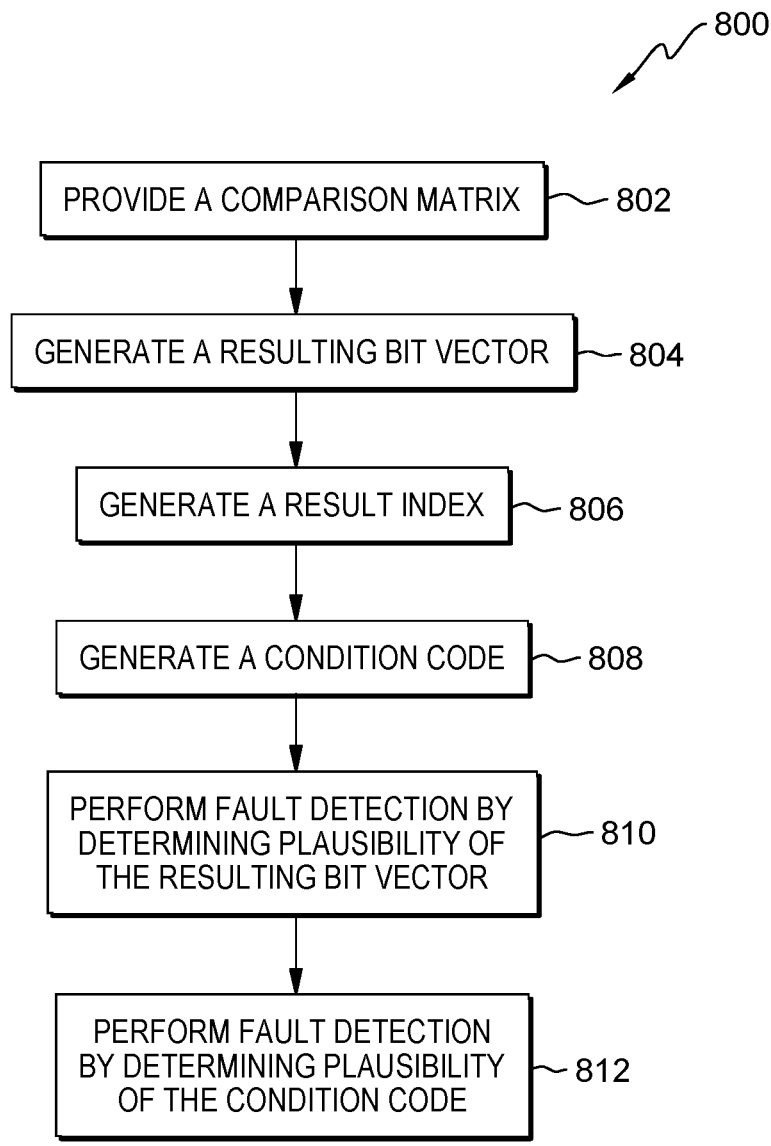
FIG. 8 is a flowchart of a method for detecting faults in sub string search operations by checking plausibility of the resulting bit vector and the reported condition code, in accordance with embodiments of the present invention.

FIG. 8 is a flowchart of a method 800 for detecting faults in substring search operations, in accordance with embodiments of the present invention using a processor unit 200 comprising vector registers of M vector elements each. A vector element is an n-bit element for encoding a character. The case where L<M indicates that a substring search of the L characters is performed.

In block 802, the reference string may be loaded in a first register of the registers 119, a target string may be loaded in a second register of the registers 119 and a comparison matrix 214 may be provided. The target string may be checked if it contains the full and/or only part of the reference string using the comparison matrix 214.

In block 804, a resulting bit vector is generated. The resulting bit vector comprises a bit value at a bit position that marks the beginning of a substring of the target string that fully matches the string and another bit value at another bit position marking the beginning of a substring of the target string that partially matches the string. The resulting bit vector may contain indication of both, full matches and partial matches that occur at the end of the target string. To generate the resulting bit vector a conjunction of an anticipated intermediate result, which is not capable of distinguishing between full matches and partial matches, with a correction mask that masks out the upper L-1 bits may be performed in order to suppress partial matches from the resulting bit vector.

In block 806, a result index of a first match is generated. In one embodiment, the result index is derived from the generated resulting bit vector. For example, the search of a reference string "noon" within a target string "abhighnoo-noonnoo" returns the result index value equal to 6 (since, 6th bit of the target string is the first match).

In block 808, a condition code is generated. In one embodiment, the condition code may be generated by the condition code generator 248 (shown in FIG. 2) based on a combination of the following inputs: the target isolation mask 226, the correction mask 228 and the anticipated intermediate result based on the indication of the full match results 240. In one embodiment, the condition code generator 248 may comprise a decoder. The generated condition code 250 may be stored in a corresponding flip-flop 252.

In block 810, fault detection is performed by determining plausibility of the resulting bit vector using the fault detection logic 300, 400, 500 and the misalignment detection logic 600 described herein. In accordance with an embodiment of the present invention, the fault detection logic 300 is configured to check plausibility of the resulting bit vector and to detect faults when a beginning subset of the resulting bit vector is different from a subset of the first row of the comparator matrix. In addition, the fault detection logic 400 is configured to check plausibility of the resulting bit vector and to detect faults when the output of the resulting bit vector indicates a match at a position beyond the implicit termination of the target string. Furthermore, the fault detection logic 500 is configured to check plausibility of the resulting bit vector and to detect faults when the output of the resulting bit vector indicates a full match, while at the same time all bits of the matchable region within the resulting bit vector are set to 0. The misalignment detection logic 600 is configured to detect misalignments when a resulting bit vector is not aligned with an element size.

In block 812, fault detection is performed by determining plausibility of the condition code using the fault detection logic 700, 717, 729 and 741 described herein. In accordance with an embodiment of the present invention, the fault detection logic 700 is configured to check plausibility of the reported CC0 condition code and to detect faults when the CC0 code is reported despite the result generating logic detecting a match or an EOS. The fault detection logic 717 is configured to check plausibility of the reported CC1 condition code and to detect faults when the CC1 code is reported despite the result generating logic detecting a match or not detecting an EOS. The fault detection logic 729 is configured to check plausibility of the reported CC2 condition code and to detect faults when the CC2 code is reported despite the result generating logic detecting only a partial match or no match at all. The fault detection logic 741 is configured to check plausibility of the reported CC3 condition code and to detect faults when the CC3 code is reported despite the result generating logic detecting a full match or no match at all.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting faults in substring search operations, the method comprising:
providing, using a processor unit comprising vector registers of M vector elements each, an M×M matrix of comparators for characterwise comparison of the elements of a reference string stored in a first one of the vector registers and a target string stored in a second one of the vector registers, wherein a vector element is an n-bit element for encoding a character;
generating a resulting bit vector using comparison performed by the M×M matrix, the resulting bit vector indicating characters of the target string that fully match the reference string and indicating characters of the target string that partially match the reference string; and
performing fault detection in the substring search operations by utilizing the resulting bit vector.

2. The method of claim 1, wherein generating the resulting bit vector further comprises generating an index of the resulting bit vector for identifying a first match of the reference string within the target string based on the resulting bit vector and generating a condition code indicating a type of a detected match based on the resulting bit vector.

3. The method of claim 2, wherein performing the fault detection further comprises comparing the resulting bit vector with a first row of the M×M matrix and indicating an error if the resulting bit vector is different from a subset of the first row of the M×M matrix.

4. The method of claim 2, further comprising generating a zero detect vector having a value indicative of a terminating element of the target string and comparing the resulting bit vector with the zero detect vector, wherein performing the fault detection further comprises indicating an error if the bit position within the resulting bit vector of the bit indicating a match is higher than the bit position within the zero detect vector of the bit indicating the terminating element of the target string.

5. The method of claim 2, further comprising determining a matchable region within the target string and comparing the resulting bit vector with the matchable region and wherein performing the fault detection further comprises indicating an error if the condition code indicates a full match and all bits of the matchable region within the target string are set to 0.

6. The method of claim 2, wherein performing the fault detection further comprises indicating an error if the resulting bit vector is misaligned with a vector element.

7. The method of claim 6, wherein misalignment is detected if at least one byte different from a first byte of the vector element of the resulting bit vector is set to 1.

8. The method of claim 2, further comprising generating a zero detect vector having a value indicative of a terminating element of the target string, comparing the condition code with the generated index, and comparing the condition code with the zero detect vector, and wherein performing the fault detection further comprises indicating an error (a) if the condition code indicates that (1) no full string match has been detected, (2) no partial match has been detected and (3) no terminating elements have been detected or (b) if (1) the generated index indicates the first match or (2) the zero detect vector has a bit value set to 1 indicating the terminating element of the target string.

9. The method of claim 8, wherein performing the fault detection further comprises indicating an error (a) if the condition code indicates that no full string match has been detected and no partial match has been detected and indicating that the terminating element has been detected or (b) if the generated index indicates the first match or the zero detect vector has all bits set to 0 indicating no terminating element of the target string has been detected.

10. The method of claim 8, further comprising determining a match type based on the resulting bit vector, comparing the condition code with the generated index, and comparing the condition code with the determined match type, and wherein performing the fault detection further comprises indicating an error if (a) the condition code indicates that a full string match has been detected or (b) if (1) the generated index indicates that no match has been detected or (2) the resulting bit vector indicates that a partial match has been detected.

11. The method of claim 10, wherein performing the fault detection further comprises indicating an error if (a) the condition code indicates that a partial match has been detected and no full string match has been detected or (b) if (1) the generated index indicates that no match has been detected or (2) the resulting bit vector indicates that a full match has been detected.

12. A processor unit for detecting faults in substring search operations, the processor unit comprising:

a plurality of vector registers of M vector elements each, wherein a vector element is an n-bit element for encoding a character;

an M×M matrix of comparators for characterwise comparison of elements of a first register of the plurality of vector registers storing the reference string and elements of a second register of the plurality of vector registers storing a target string;

a result generating logic for generating a resulting bit vector, the resulting bit vector indicating characters of the target string that fully match the reference string and indicating characters of the target string that partially match the reference string; and a fault detection logic for performing fault detection in the substring search operations by utilizing the resulting bit vector.

13. The processor unit of claim 12, wherein generating the resulting bit vector further comprises generating an index of the resulting bit vector for identifying a first match of the reference string within the target string based on the resulting bit vector and generating a condition code indicating a type of a detected match based on the resulting bit vector.

14. The processor unit of claim 13, wherein performing the fault detection further comprises comparing the resulting bit vector with a first row of the M×M matrix and indicating an error if the resulting bit vector is different from a subset of the first row of the M×M matrix.

15. The processor unit of claim 13, further comprising a zero detect logic for generating a zero detect vector having a value indicative of a terminating element of the target string, wherein performing the fault detection further comprises indicating an error if the bit position within the resulting bit vector of the bit indicating a match is higher than the bit position within the zero detect vector of the bit indicating the terminating element of the target string.

16. The processor unit of claim 13, wherein the fault detection logic determines a matchable region within the target string and compares the resulting bit vector with the matchable region and wherein performing the fault detection further comprises indicating an error if the condition code indicates a full match and all bits of the matchable region within the target string are set to 0.

17. The processor unit of claim 13, wherein performing the fault detection further comprises indicating an error if the resulting bit vector is misaligned with a vector element.

18. The processor unit of claim 17, wherein misalignment is detected if at least one byte different from a first byte of the vector element of the resulting bit vector is set to 1.

19. The processor unit of claim 13, further comprising a zero detect logic for generating a zero detect vector having a value indicative of a terminating element of the target string and wherein performing the fault detection further comprises indicating an error (a) if the condition code indicates that no full string match has been detected, no partial match has been detected and no terminating elements have been detected or (b) if (1) the generated index indicates the first match or (2) the zero detect vector has a bit value set to 1 indicating the terminating element of the target string.

20. A computer-program product for detecting faults in substring search operations, the computer-program product comprising a computer-readable storage medium having program instructions embodied therewith, the program instructions executable by a processor to cause the processor to perform a method comprising:

providing, using a processor unit comprising vector registers of M vector elements each, an M×M matrix of comparators for characterwise comparison of the elements of a reference string stored in a first one of the vector registers and a target string stored in a second one of the vector registers, wherein a vector element is an n-bit element for encoding a character;

generating a resulting bit vector using comparison performed by the M×M matrix, the resulting bit vector indicating characters of the target string that fully match the reference string and indicating characters of the target string that partially match the reference string; and performing fault detection in the substring search operations by utilizing the resulting bit vector.

* * * * *